R. T. NEWTON.
SHOCK ELIMINATOR.
APPLICATION FILED DEC. 23, 1916.

1,279,482.

Patented Sept. 17, 1918.
2 SHEETS—SHEET 1.

Attest:

Inventor:
RICHARD T. NEWTON
by
Attys.

R. T. NEWTON.
SHOCK ELIMINATOR.
APPLICATION FILED DEC. 23, 1916.

1,279,482.

Patented Sept. 17, 1918.
2 SHEETS—SHEET 2.

Attest:
H. C. McGinn

Inventor:
RICHARD T. NEWTON
Herron and Herron Attys.

UNITED STATES PATENT OFFICE.

RICHARD T. NEWTON, OF NEW YORK, N. Y.

SHOCK-ELIMINATOR.

1,279,482.

Specification of Letters Patent.  Patented Sept. 17, 1918.

Application filed December 23, 1916.  Serial No. 138,566.

*To all whom it may concern:*

Be it known that I, RICHARD T. NEWTON, a citizen of the United States of America, and residing in the city, county, and State of New York, have invented a certain new and useful Improvement in Shock-Eliminators, of which the following is a specification.

My invention relates to shock eleminators and particularly to a device of this type adapted to be applied to motor cars. The object of my invention is to provide an inexpensive and efficient construction for the purpose, which may be embodied in the car construction as a permanent element thereof or may be manufactured independently and applied to the car as an accessory.

In the accompanying drawings.

Figure 3:
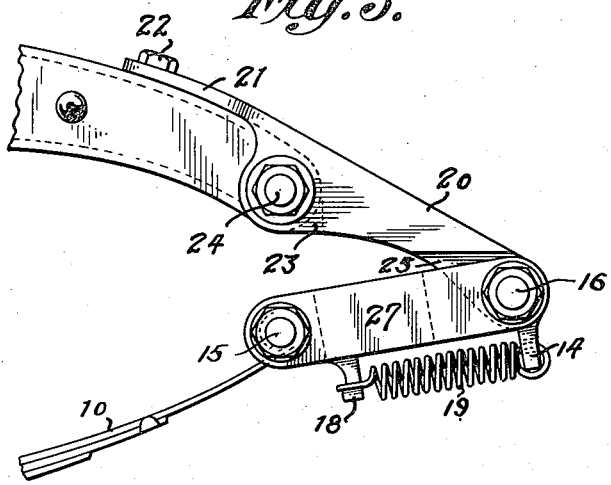
Figure 4:
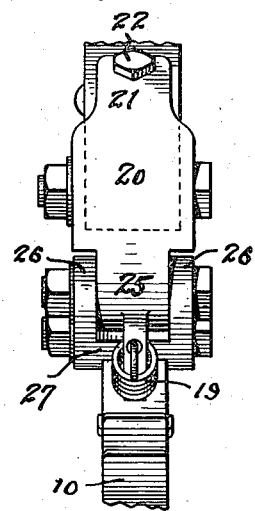
Figure 5:
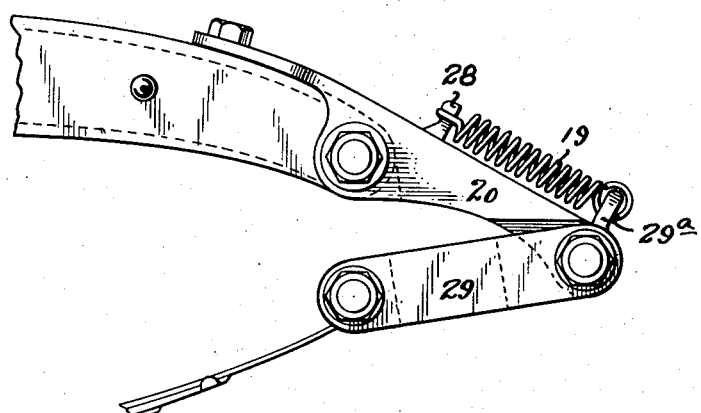
Figure 6:
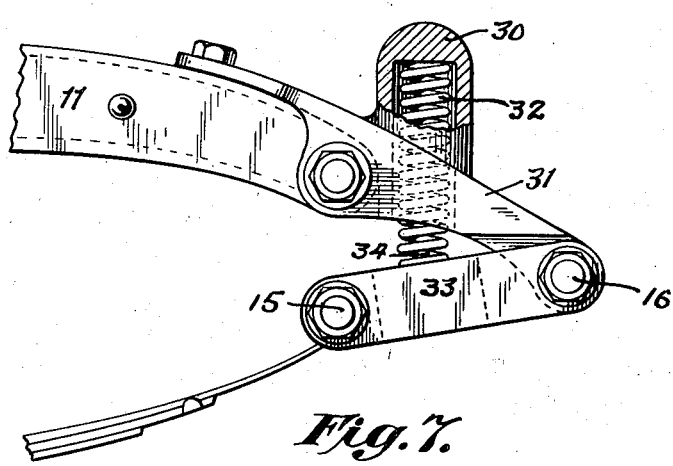
Figure 7:
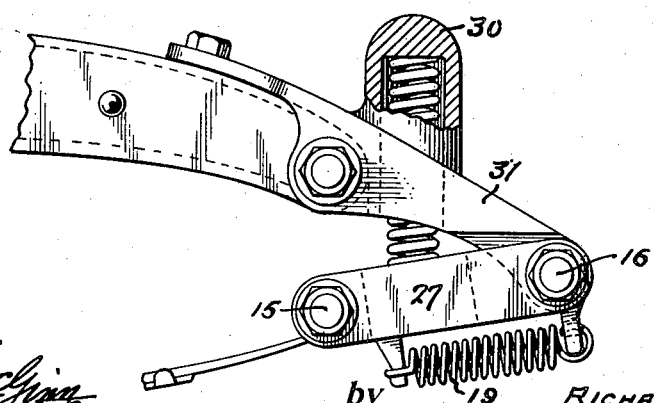

Figs. 3 and 4 are similar views showing the shock eliminator constructed and applied as an accessory; and Figs. 5, 6 and 7 are side elevations, partially in section in Figs. 6 and 7, of various modifications of construction.

The function of a shock eliminator is to cushion the action of the relatively heavy leaf springs 10 on which the car chassis 11 is supported. Various more or less complicated devices for accomplishing this purpose are in common use, but they are rather expensive accessories, and the benefits of a shock eliminator are lost to many owners of cars as a consequence of this fact. The present invention provides an efficient but inexpensive shock eliminator which may be either built in as part of the car or made as an attachment readily applied to the car.

Figure 1:
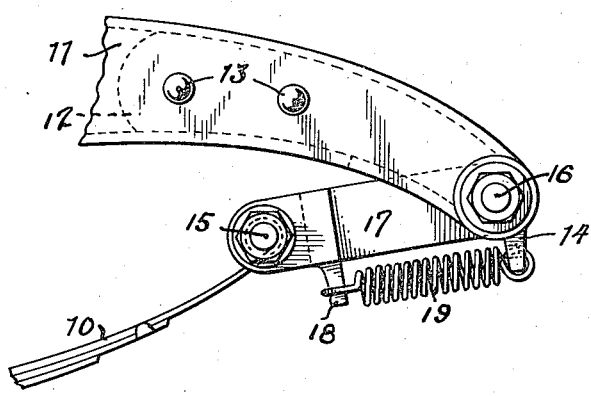
Figure 1 is a side elevation of the end of a side bar of a chassis frame showing a shock absorber embodying my invention associated therewith.
Figure 2:
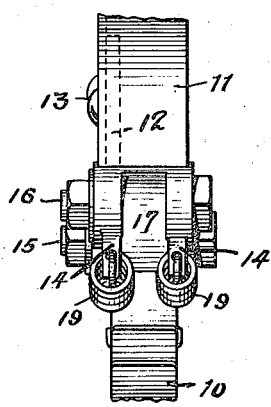
Fig. 2 is a front elevation thereof.

As shown in Fig. 1 the device comprises a forwardly extending arm 12 riveted at 13 to the end of the chassis 11 so as to be rigid therewith. A lug or lugs 14 is formed at the forked end of this arm. Intermediate this arm and the end of the leaf spring 10 I freely pivot, at each end 15 and 16, a lever link 17 having a lug 18, between which and the lug 14 is stretched a coil spring or springs 19. It is obvious that on the upward throw of the leaf spring 10, its motion is transmitted to the chassis through the link 17 but cushioned by the further tensioning of spring 19 as the lug 18 is moved away from the lug 14 on the upward swing of the spring end 15 of the link 17.

The same action is secured in the modification shown in Figs. 3 and 4. Here however the forward extension of the chassis instead of being permanently riveted in position, takes the form of a bracket 20 having a tongue 21, bolted at 22 to the chassis, and side wings 23 embracing the end of the chassis side bar and perforated to receive the usual spring bolt 24. At its forward end 25 the bracket is narrower and is straddled by the wings 26 at one end of the link 27 which is secured to the leaf spring 10 at 15 as in the construction above described.

In the modification of Fig. 5, the location of the spring 19 is varied by arranging it above the bracket 20, between a lug 28 thereon and an upwardly extending lug 29$^a$ on the link lever 29. The construction in other respects is like that of Figs. 3—4.

In Fig. 6 a hood 30 is cast on the bracket 31 to receive the upper end of a compression spring 32 which rests at its lower end against the upper face of the link 33. A positioning stud 34 may be provided on the latter to hold the lower end of the spring against displacement. Obviously the upward movement of the link lever 33 about the point 16 compresses spring 32 within the hood 30 and thus cushions the action of the leaf spring 10.

In Fig. 7 this compression spring construction is combined with the pull spring construction of Fig. 3, the one spring reinforcing the other but both functioning in the manner explained.

Various other arrangements will readily occur to those skilled in the art without departing from what I claim as my invention.

I claim as my invention:—

1. The combination with a vehicle having a chassis side bar with downwardly extending forward end pierced to receive a transverse spring bolt, and a supporting spring underlying said bar, of a shock absorber comprising a bracket of channel section adapted to overlie and embrace the end of said chassis side bar and having its sides pierced in register with the holes in said end to receive said spring bolt, said bracket forming a continuation of said side bar end on substantially the same downward inclination as the latter, means for securing said bracket rigidly to said side bar, a link jointed to the outer end of said bracket and underlying the latter, said link being jointed at its rear end to the forward end of the supporting spring, together with an auxiliary shock-absorbing spring and abutments on said bracket and link respectively between which said auxiliary spring extends, for the purpose described.

2. A construction such as that specified in claim 1, having abutments formed as lugs on said bracket and link respectively and a tension spring engaging said lugs, substantially as described.

In testimony whereof I have signed my name to this specification, in the presence of two subscribing witnesses.

RICHARD T. NEWTON.

Witnesses:
SAMUEL H. SHAW,
GEORGE J. SABEL.